(12) United States Patent
Kim et al.

(10) Patent No.: US 8,325,894 B2
(45) Date of Patent: Dec. 4, 2012

(54) METHOD, SYSTEM, AND PROGRAM PRODUCT FOR MANAGING CONFERENCE CALLS

(75) Inventors: Moon J. Kim, Wappingers Falls, NY (US); John E. Moore, Jr., Brownsburg, IN (US); Eric C. Yee, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 1312 days.

(21) Appl. No.: 11/462,054

(22) Filed: Aug. 3, 2006

(65) Prior Publication Data

US 2008/0043961 A1    Feb. 21, 2008

(51) Int. Cl.
*H04M 3/42* (2006.01)
(52) U.S. Cl. ......... 379/202.01; 379/204.01; 379/205.01; 455/416
(58) Field of Classification Search .............. 379/202.01, 379/201.01, 204.01, 203.01, 205.01; 455/416
See application file for complete search history.

(56) References Cited

U.S. PATENT DOCUMENTS

| | | | | |
|---|---|---|---|---|
| 5,978,463 | A * | 11/1999 | Jurkevics et al. | 379/202.01 |
| 6,072,867 | A | 6/2000 | Lieuwen | |
| 6,330,320 | B1 | 12/2001 | Cornell et al. | |
| 6,920,212 | B2 * | 7/2005 | Stern et al. | 379/202.01 |
| 2002/0030253 | A1 | 3/2002 | Grigg et al. | |
| 2002/0077259 | A1 | 6/2002 | Skee | |
| 2003/0072428 | A1 | 4/2003 | Stern et al. | |
| 2004/0077259 | A1 | 4/2004 | Barri | |
| 2004/0101119 | A1 | 5/2004 | Malcolm et al. | |
| 2004/0125933 | A1 * | 7/2004 | Jun et al. | 379/202.01 |
| 2005/0018826 | A1 * | 1/2005 | Benco et al. | 379/202.01 |
| 2006/0045029 | A1 | 3/2006 | Ethier et al. | |
| 2006/0177034 | A1 | 8/2006 | Reding et al. | |
| 2007/0081651 | A1 | 4/2007 | Iyer et al. | |
| 2007/0218885 | A1 | 9/2007 | Pfleging et al. | |
| 2007/0291917 | A1 | 12/2007 | Berstis et al. | |

OTHER PUBLICATIONS

Ramakrishnaiah, Office Action Summary for U.S. Appl. No. 11/613,440 dated Jan. 4, 2011, 12 pages.
Ramakrishnaiah, Office Action Summary for U.S. Appl. No. 11/613,440 dated Jun. 15, 2011, 13 pages.

* cited by examiner

*Primary Examiner* — Thjuan K Addy
(74) *Attorney, Agent, or Firm* — William E. Schiesser; Hoffman Warnick LLC

(57) ABSTRACT

The present invention provides a method, system, and program product for managing conference calls. Specifically, under the present invention, a moderator and a set (at least one) of invitees (collectively referred to herein as participants) of a conference call are identified. This is typically done based on synchronization with a calendar application used to send and accept an invitation to the conference call. Thereafter, unique conference call numbers associated with the moderator and each of the set of invitees are determined (e.g., by accessing profiles for each participant contained within a directory or the like). Calls are then received from the moderator and invitees(s) using the unique conference call numbers assigned thereto. Although the calls were made using unique conference call numbers, the calls will then be joined under the present invention to initiate the conference call.

22 Claims, 4 Drawing Sheets

METHOD, SYSTEM, AND PROGRAM PRODUCT FOR MANAGING CONFERENCE CALLS

CROSS-REFERENCE TO RELATED APPLICATION

This application is related in some aspects to the commonly owned and co-pending application entitled "Method, System, and Program Product for Contacting Conference Call Participants", was filed on Dec. 20, 2006 and was assigned Ser. No. 11/613,440.

FIELD OF THE INVENTION

The present invention generally relates to conference call management. Specifically, the present invention provides a method, system, and program product for managing conference calls.

BACKGROUND OF THE INVENTION

With the continued growth of information technology, it is becoming increasingly common for co-workers to be remote from one another (not co-located). To this extent, tools such as conference calls are becoming vital for collaboration. Currently, in utilizing the conference calls, each individual in an organization/enterprise is given a unique conference call number and pass code that gives them the ability to hold a conference call session. For example, individual A might be assigned conference call number 800-555-4567 and pass code 123000, while another individual might be assigned conference call number 800-555-7897 and pass code 456000.

In order to arrange for a conference call, the moderator/administrator will send an invitation (to potential invitees) that includes the unique conference call number and pass code assigned to the moderator. When the time for the conference call arrives, each participant (moderator and invitee) must place a call to the unique conference call number assigned to the moderator, and then input the associated pass code. All participants who dialed in, and inputted the correct pass code will be joined in a conference call session. This requires that all participants make note or remember the unique conference call number and pass code of the moderator, and then dial into the conference call using the number and pass code at the appropriate time. Given that any collaborative group could have many individuals, the quantity of distinct conference call numbers and pass codes can be unlimited. Unless the invitees have access to their calendar application, which may have copied the conference call number and pass code from the original invitation, or can access a directory of conference call numbers and pass codes, the invitees will be forced to recall such information from memory.

In view of the foregoing, there exists a need for a solution that solves at least one of the deficiencies of the related art.

SUMMARY OF THE INVENTION

In general, the present invention provides a method, system, and program product for managing conference calls. Specifically, under the present invention, a moderator and a set (at least one) of invitees (collectively referred to herein as participants) of a conference call are identified. This is typically done based on synchronization with a calendar application used to send and accept an invitation to the conference call. Thereafter, unique conference call numbers associated with the moderator and each of the set of invitees are determined (e.g., by accessing profiles for each participant contained within a directory or the like). Calls are then received from the moderator and invitees(s) using the unique conference call numbers assigned thereto. Although the calls were made using unique conference call numbers, the calls will then be joined under the present invention to initiate the conference call.

A first aspect of the present invention provides a method for managing conference calls, comprising: identifying a moderator and a set of invitees of a conference call; determining unique conference call numbers associated with the moderator and each of the set of invitees; receiving a call from the moderator made using the unique conference call number assigned to the moderator; receiving a set of calls from the set of invitees made using the unique conference call numbers assigned to the set of invitees; and joining the call and the set of calls to initiate the conference call.

A second aspect of the present invention provides a system for managing conference calls, comprising: a system for identifying a moderator and a set of invitees of a conference call; a system for determining unique conference call numbers associated with the moderator and each of the set of invitees; a system for receiving a call from the moderator made using the unique conference call number assigned to the moderator; a system for receiving a set of calls from the set of invitees made using the unique conference call numbers assigned to the set of invitees; and a system for joining the call and the set of calls to initiate the conference call.

A third aspect of the present invention provides a system for managing conference calls, comprising: means for identifying a moderator and a set of invitees of a conference call; means for determining unique conference call numbers associated with the moderator and each of the set of invitees; means for receiving a call from the moderator made using the unique conference call number assigned to the moderator; means for receiving a set of calls from the set of invitees made using the unique conference call numbers assigned to the set of invitees; and means for joining the call and the set of calls to initiate the conference call.

A fourth aspect of the present invention provides a program product stored on a computer readable medium for managing conference calls, the program product comprising program code for causing a computer system to perform the following steps: identifying a moderator and a set of invitees of a conference call; determining unique conference call numbers associated with the moderator and each of the set of invitees; receiving a call from the moderator made using the unique conference call number assigned to the moderator; receiving a set of calls from the set of invitees made using the unique conference call numbers assigned to the set of invitees; and joining the call and the set of calls to initiate the conference call.

A fifth aspect of the present invention provides a method for deploying an application for managing conference calls, comprising: providing a computer infrastructure being operable to: identify a moderator and a set of invitees of a conference call; determine unique conference call numbers associated with the moderator and each of the set of invitees; receive a call from the moderator made using the unique conference call number assigned to the moderator; receive a set of calls from the set of invitees made using the unique conference call numbers assigned to the set of invitees; and join the call and the set of calls to initiate the conference call.

A sixth aspect of the present invention provides computer software embodied in a propagated signal for managing conference calls, the computer software comprising instructions for causing a computer system to perform the following steps: identifying a moderator and a set of invitees of a conference call; determining unique conference call numbers associated with the moderator and each of the set of invitees; receiving a call from the moderator made using the unique conference call number assigned to the moderator; receiving a set of calls from the set of invitees made using the unique conference call numbers assigned to the set of invitees; and joining the call and the set of calls to initiate the conference call.

A seventh aspect of the present invention provides a business method for managing conference calls.

BRIEF DESCRIPTION OF THE DRAWINGS

These and other features of this invention will be more readily understood from the following detailed description of the various aspects of the invention taken in conjunction with the accompanying drawings in which.

Figure 1:
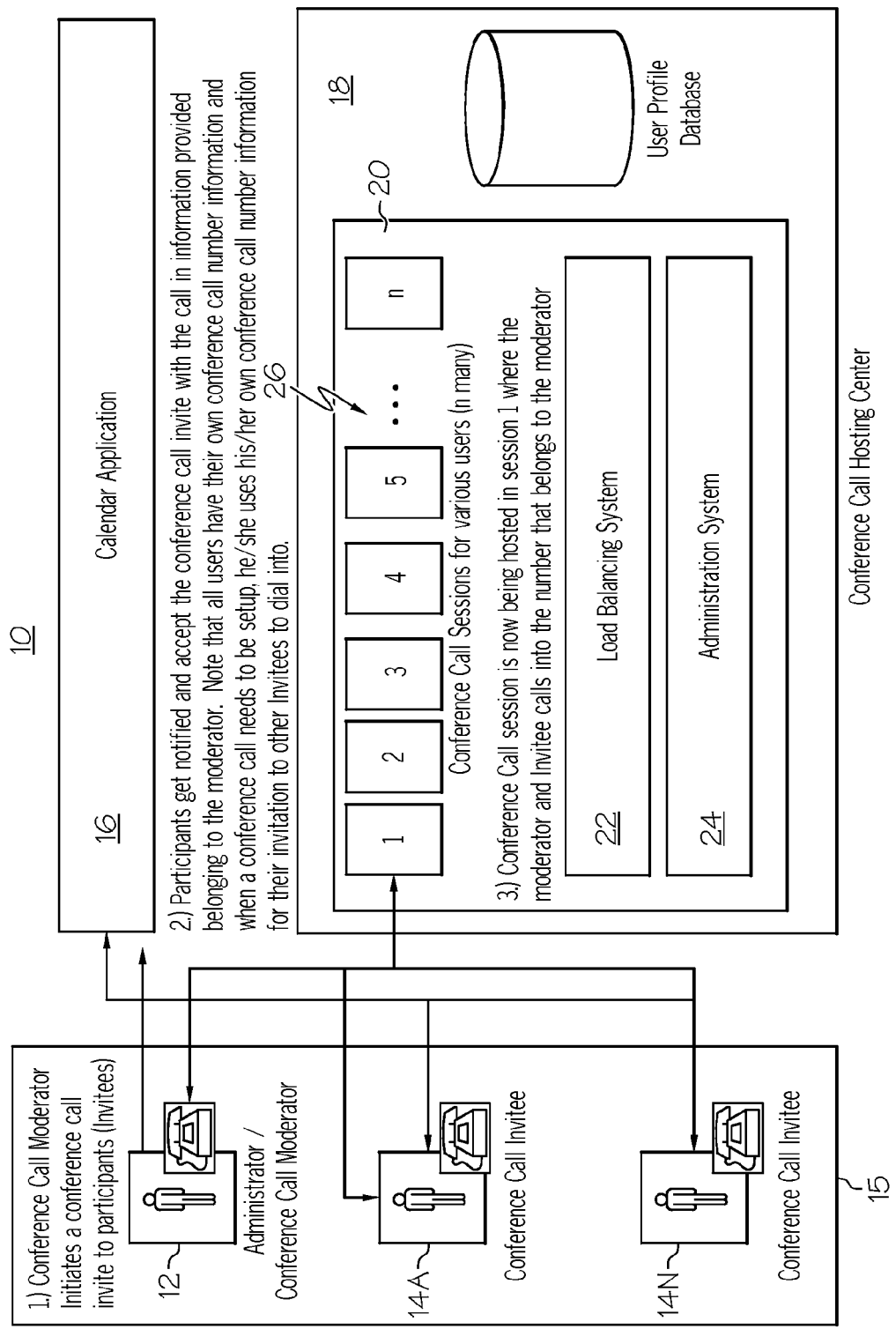
FIG. 1 shows a conference call environment according to the prior art.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections
I. General Description
II. Computerized Implementation
I. General Description As indicated above, the present invention provides a method, system, and program product for managing conference calls. Specifically, under the present invention, a moderator and a set (at least one) of invitees (collectively referred to herein as participants) of a conference call are identified. This is typically done based on synchronization with a calendar application used to send and accept an invitation to the conference call. Thereafter, unique conference call numbers associated with the moderator and each of the set of invitees are determined (e.g., by accessing profiles for each participant contained within a directory or the like). Calls are then received from the moderator and invitees(s) using the unique conference call numbers assigned thereto. Although the calls were made using unique conference call numbers, the calls will then be joined under the present invention to initiate the conference call.

Referring now to FIG. 1, a conference call environment 10 according to the prior art is shown. Under environment 10, a moderator 12 of a conference call will initially schedule a conference call using calendar application 16 (e.g., LOTUS NOTES). LOTUS, NOTES, and LOTUS NOTES are trademarks of IBM Corp. in the United States and/or other countries. In scheduling the conference call, moderator 12 will select a date and time, and a set (at least one) of invitees 14A-N. Calendar application 16 will then transmit an electronic invitation to invitees 14A-N, who will then accept or decline the invitation. In a typical embodiment, the invitation includes the unique conference call number and pass code for moderator 12. Upon acceptance of the invitation, this information will be populated into the appropriate date and time slot of invitees 14A-N respective electronic calendars maintained by calendar application 16 (and local components thereof). When the time arrives for the conference call, moderator 12 and invitees 14A-N (collectively referred to as participants 15) will dial into the conference call using the unique conference call number and pass code of moderator 12, as communicated in the invitation (i.e., the call-in information is moderator dependent). To this extent, moderator 12 and invitees 14A-N must either recall these values from their memory, have written them down, or be able to access their electronic calendars in order to dial in. Since the conference call number and pass code are unique to moderator 12, this is not an easy task for invitees 14A-N. This is especially not an easy task given that a collaborative could have a high quantity of individuals, who would each be forced to remember or record the unique conference call numbers and pass codes of all of their colleagues.

In any event, moderator 12 and invitees 14A-N will dial into conference call center 18 using the conference call number of moderator 12. As shown, conference call center 18 maintains a conference call application 20 shown including load balancing system 22 and administration system 24 that coordinates conference calls. Specifically, conference call application 20 will accept pass codes dialed in by conference call participants, and administration system 24 will commence a single conference call session 26 for all participants inputting the correct pass code. Load balancing system 22 ensures that sufficient bandwidth exists for maintaining scheduled conference calls.

Figure 2:
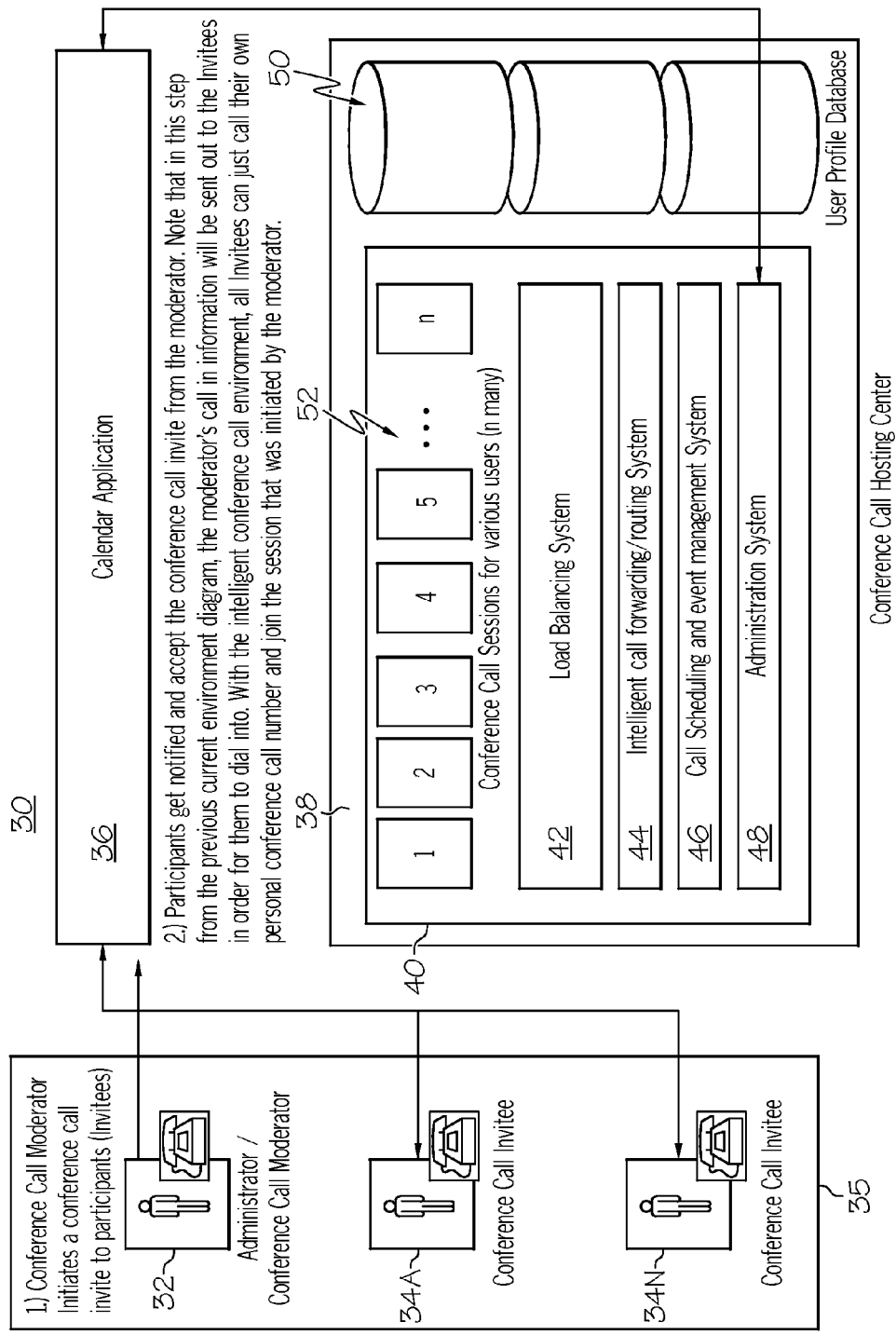
FIG. 2 shows a conference call environment according to the present invention.

The present invention addresses these issues by providing a conference call system in which participants must only know their own unique conference call numbers and optionally pass codes in order to dial into a conference call, regardless of who is the moderator (i.e., the call-in information is not moderator dependent). Referring to FIG. 2, a first diagram of a conference call environment 30 according to the present invention is shown. In general, environment allows each moderator 32 and invitees 34A-N to dial into a conference call using their own unique conference call numbers and pass codes.

Under environment 30, a conference call can be scheduled in a fashion similar to environment 10 of FIG. 1. Specifically, moderator 32 will select a date and time, and use calendar application 36 to send electronic invites to invitees 34A-N. However, the invitation need not contain the unique conference call number and pass code for moderator 32. Upon acceptance of the invitation, a notation for the conference call will be stored at the scheduled date and time in the electronic calendars of invitees 34A-N. Under the present invention, calendar application 36 will synchronize with call scheduling and event management system 46 of conference call application 40 so that the participants who will be attending are identified to conference call application 40 (e.g., based on their creation or acceptance of the invitation). Once the participants are identified, call scheduling and event management system 46 will query user profile database(s) 50 to retrieve the unique conference call numbers and pass codes for all participants, and create a "trigger" event for the exact date and time of the conference call scheduled. This will enable intelligent call forwarding/routing system 44 to later join the calls/call sessions started by each participant together to initiate the conference call.

Figure 3:
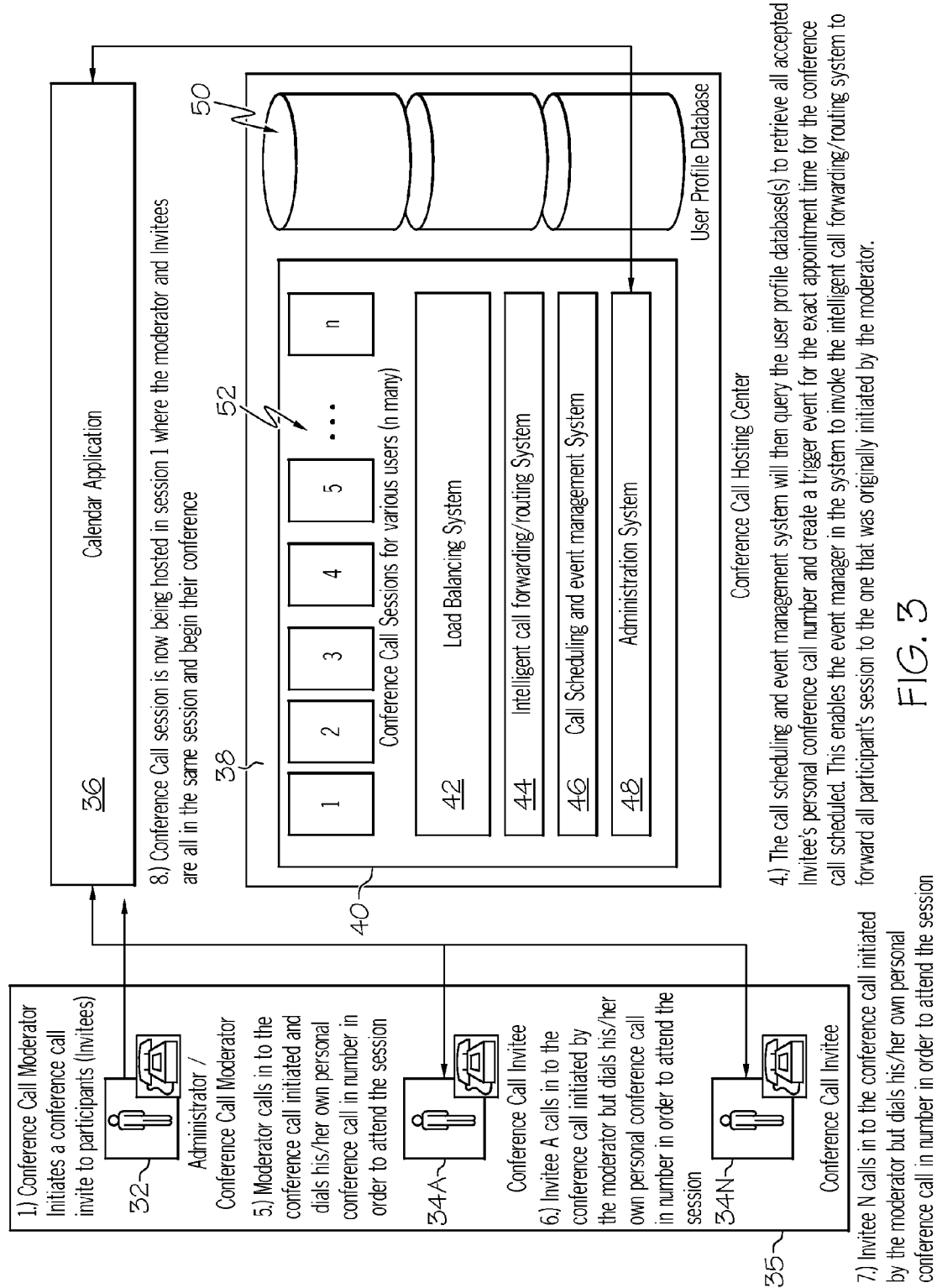
FIG. 3 shows a continuation of the conference call environment of FIG. 2 according to the present invention.

Specifically, referring to FIG. 3, around the scheduled date and time, moderator 32 and invitees 34A-N (assuming they accepted the invitation) will dial into conference call center 38 using their own unique conference call numbers. Further, when prompted by conference call application 40 to input a pass code, moderator 32 and invitees 34A-N will input their own unique pass codes. As each pass code is input by moderator 32 and invitees 34A-N, an individual conference call session 52 will be initiated by administration system 48. For example, if there are two invitees "A" and "B", two individual sessions 52 will be initially/temporarily formed. Once moderator 32 joins the conference call, intelligent call forwarding/routing system 44 will join the calls/individual sessions 52 of invitees 34A-N with moderator 32's session 52 at which point the multi-participant conference call is "initiated." Specifically, intelligent call forwarding/routing system 44 can forward the individual sessions of invitee "A" and "B" to the individual session of moderator 32. If another invitee "C" later joins, his/her individual session 52 (as initiated by administration system 48) will be joined with moderator 34's session (to which invitees "A's" and "B's" sessions were already joined).

Load balancing system 42 ensures that sufficient bandwidth exists for scheduling, initiating, and/or maintaining a conference call. This could be ensured by limiting a number of participants in a given conference call and/or dropping participants a from conference call, as necessary, according to a set of preference rules (e.g., based on role within an organization, based on an order in which they joined the call, etc.). It could also include increasing bandwidth to meet conference call requirements so that all participants can still be included in the scheduled conference calls and/or limiting the number of conference calls scheduled during a single time period.

The present invention should also be understood to provide various other features/functions. For example, if moderator 32 fails to dial in within a predefined time period of the scheduled start time of the conference call, intelligent call forwarding/routing system 44 could join the calls/individual sessions 52 of the invitees 34A-N that have dialed in. In addition, if an invitee 34A-N has not been assigned a unique conference call number and pass code (e.g., call scheduling and event management system 46 fails to find this information in user profile database(s) 50, another "trigger" event could be sent to administration system 48 to cause assignment of a unique conference call number and pass code to that invitee. In making this assignment, administration system 48 will examine user profile database(s) 50 to avoid conflicts such as assigning a number that has already been assigned.

II. Computerized Implementation

Figure 4:
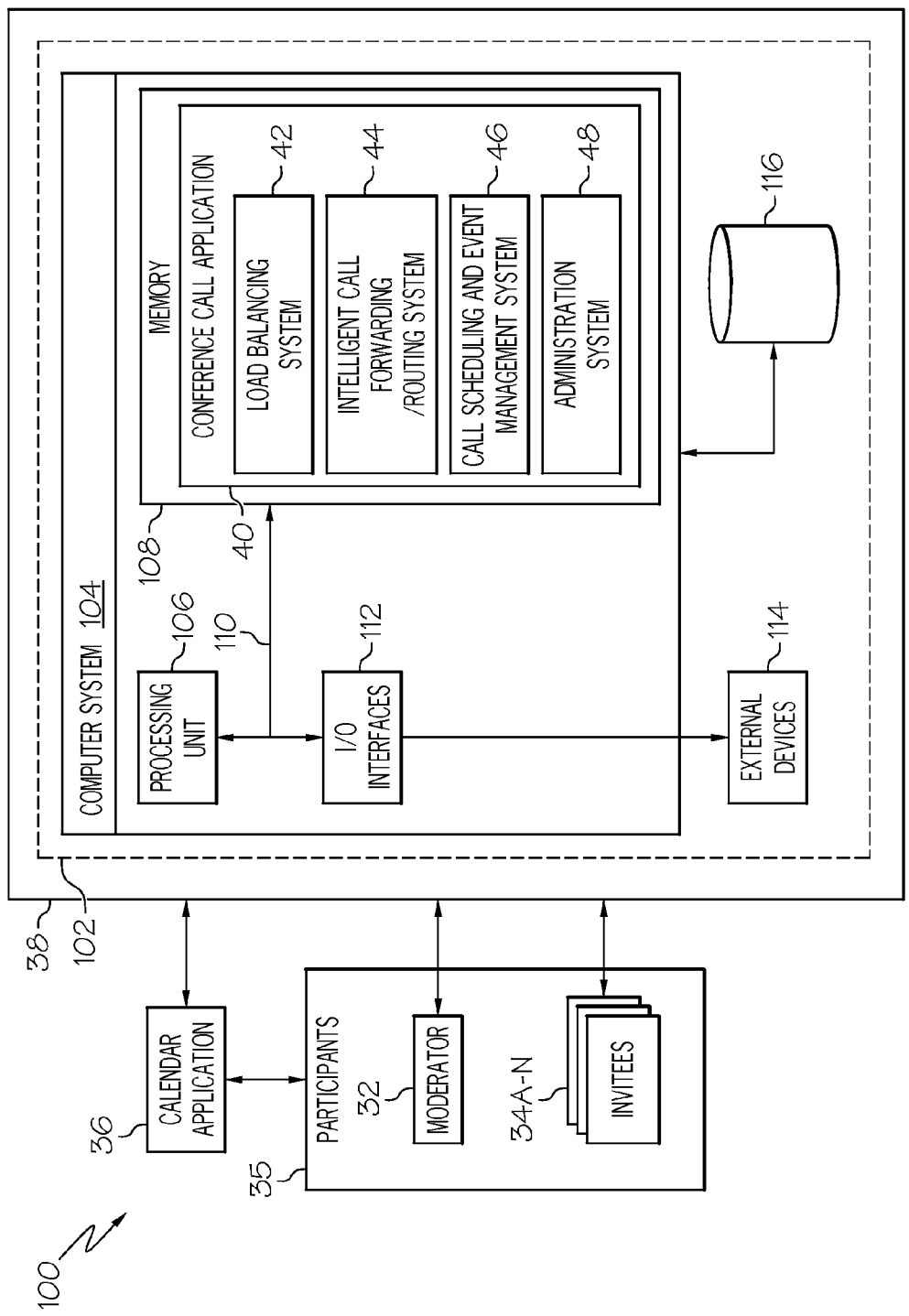
FIG. 4 shows a more specific computerized implementation of the present invention.

Referring now to FIG. 4, a more detailed diagram of a computerized implementation 100 of the present invention is shown. As depicted, implementation 100 includes a computer system 104 deployed within a computer infrastructure 102 such as that existing within conference call center 38. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, computer system 104 includes a processing unit 106, a memory 108, a bus 110, and input/output (I/O) interfaces 112. Further, computer system 104 is shown in communication with external I/O devices/resources 114 and storage system 116. In general, processing unit 106 executes computer program code, such as conference call application 40, which is stored in memory 108 and/or storage system 116. While executing computer program code, processing unit 106 can read and/or write data to/from memory 108, storage system 116, and/or I/O interfaces 112. Bus 110 provides a communication link between each of the components in computer system 104. External devices 114 can comprise any devices (e.g., keyboard, pointing device, display, etc.) that enable a user to interact with computer system 104 and/or any devices (e.g., network card, modem, etc.) that enable computer system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process steps of the invention. Moreover, computer system 104 is only representative of various possible computer systems that can include numerous combinations of hardware. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, I/O interfaces 112 can comprise any system for exchanging information with one or more external device 114. Still further, it is understood that one or more additional components (e.g., system software, math co-processing unit, etc.) not shown in FIG. 4 can be included in computer system 104. However, if computer system 104 comprises a handheld device or the like, it is understood that one or more external devices 114 (e.g., a display) and/or storage system 116 could be contained within computer system 104, not externally as shown.

Storage system 116 can be any type of system (e.g., a database) capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computer system 104.

Shown in memory 108 of computer system 104 is conference call application 40, which includes load balancing system 42, intelligent call forwarding/routing system 44, call scheduling and event management system 46, and administration system 48. These systems perform the functions of the present invention as discussed above. Specifically, call scheduling and event management system 46 will synchronize with calendar application 36 so that a scheduled conference call, and invitees who have accepted the conference call invitation, can be identified. Thereafter, call scheduling and event management system 46 will query user profile database(s) 50 to determine the unique conference call numbers and pass codes for moderator 32 and invitees 34A-N and establish a "trigger" event for intelligent call forwarding/routing system 44.

As participants 35 dial into conference call center 38 using their own unique conference call numbers and pass codes, administration system 48 will initiate separate conference call sessions. As sessions are initiated, they will be forwarded/joined by intelligent call forwarding/routing system 44 to moderator 32's conference call session. Thus, the end result is a single conference call session that all participants 35 were able to join using their own unique conference call numbers and pass codes.

While shown and described herein as a method and system for managing conference calls, it is understood that the invention further provides various alternative embodiments. For example, in one embodiment, the invention provides a computer-readable/useable medium that includes computer program code to enable a computer infrastructure to manage conference calls. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 4) and/or storage system 116 (FIG. 4) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer to manage conference calls. In this case, the service provider can create, maintain, support, etc., a computer infrastructure, such as computer infrastructure 102 (FIG. 4) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for managing conference calls. In this case, a computer infrastructure, such as computer infrastructure 102 (FIG. 4), can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 104 (FIG. 4), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for managing conference calls, comprising:
    identifying a moderator and a set of invitees of a conference call;
    determining unique conference call numbers associated with each of a plurality of users, that include the moderator and each of the set of invitees, every one of the moderator and the each of the set of invitees having a conference call number that is unique to that user and that is configured to enable the user to join a plurality of conference calls having differing moderators and sets of invitees;
    receiving a call from the moderator made using the unique conference call number assigned to the moderator;
    receiving a set of calls from each of the set of invitees made using the unique conference call numbers assigned to the set of invitees; and
    joining the call and the set of calls to initiate the conference call.

2. The method of claim 1, further comprising:
    starting a conference call session with the moderator after receiving the call from the moderator; and
    starting a set of conference call sessions with the set of invitees after receiving the set of calls, wherein the joining comprises forwarding the set of conference call sessions started with the set of invitees to the conference call session started with the moderator.

3. The method of claim 1, wherein the identifying comprises identifying the set of invitees based on their acceptance of an invitation to the conference call.

4. The method of claim 1, wherein the determining comprises accessing profiles for the moderator and the set of invitees to determine the unique conference call numbers.

5. The method of claim 1, further comprising scheduling the conference call with a calendar application, wherein the identifying comprises synchronizing the calendar application with a conference call application.

6. The method of claim 5, wherein the calendar application sends electronic invitations to the set of invitees based on input from the moderator.

7. A system for managing conference calls, comprising:
    a system for identifying a moderator and a set of invitees of a conference call;

a system for determining unique conference call numbers associated with each of a plurality of users, that include the moderator and each of the set of invitees, every one of the moderator and the each of the set of invitees having a conference call number that is unique to that user and that is configured to enable the user to join a plurality of conference calls having differing moderators and sets of invitees;

a system for receiving a call from the moderator made using the unique conference call number assigned to the moderator;

a system for receiving a set of calls from each of the set of invitees made using the unique conference call numbers assigned to the set of invitees; and a system for joining the call and the set of calls to initiate the conference call.

8. The system of claim 7, further comprising:

a system for starting a conference call session with the moderator after receiving the call from the moderator; and a system for starting a set of conference call sessions with the set of invitees after receiving the set of calls, wherein the system for joining forwards the set of conference call sessions started with the set of invitees to the conference call session started with the moderator.

9. The system of claim 7, wherein the system for identifying identifies the set of invitees based on their acceptance of an invitation to the conference call.

10. The system of claim 7, wherein the system for determining accesses profiles for the moderator and the set of invitees to determine the unique conference call numbers.

11. The system of claim 7, wherein the system for identifying synchronizes with a calendar application used to schedule the conference call.

12. A system for managing conference calls, comprising:

means for identifying a moderator and a set of invitees of a conference call;

means for determining unique conference call numbers associated with each of a plurality of users, that include the moderator and each of the set of invitees, every one of the moderator and the each of the set of invitees having a conference call number that is unique to that user and that is configured to enable the user to join a plurality of conference calls having differing moderators and sets of invitees;

means for receiving a call from the moderator made using the unique conference call number assigned to the moderator;

means for receiving a set of calls from each of the set of invitees made using the unique conference call numbers assigned to the set of invitees; and means for joining the call and the set of calls to initiate the conference call.

13. The system of claim 12, further comprising:

means for starting a conference call session with the moderator after receiving the call from the moderator; and means for starting a set of conference call sessions with the set of invitees after receiving the set of calls, wherein the means for joining forwards the set of conference call sessions started with the set of invitees to the conference call session started with the moderator.

14. The system of claim 12, wherein the means for identifying identifies the set of invitees based on their acceptance of an invitation to the conference call.

15. The system of claim 12, wherein the means for determining accesses profiles for the moderator and the set of invitees to determine the unique conference call numbers.

16. The system of claim 12, wherein the means for identifying synchronizes with a calendar application used to schedule the conference call.

17. A program product stored on a non-transitory computer readable storage medium for managing conference calls, the program product comprising program code for causing a computer system to perform the following steps:

identifying a moderator and a set of invitees of a conference call;

determining unique conference call numbers associated with each of a plurality of users, that include the moderator and each of the set of invitees, every one of the moderator and the each of the set of invitees having a conference call number that is unique to that user and that is configured to enable the user to join a plurality of conference calls having differing moderators and sets of invitees;

receiving a call from the moderator made using the unique conference call number assigned to the moderator;

receiving a set of calls from each of the set of invitees made using the unique conference call numbers assigned to the set of invitees; and joining the call and the set of calls to initiate the conference call.

18. The program product of claim 17, wherein the computer readable medium further comprises program code for causing the computer system to perform the following steps:

starting a conference call session with the moderator after receiving the call from the moderator; and starting a set of conference call sessions with the set of invitees after receiving the set of calls, wherein the joining comprises forwarding the set of conference call sessions started with the set of invitees to the conference call session started with the moderator.

19. The program product of claim 17, wherein the identifying comprises identifying the set of invitees based on their acceptance of an invitation to the conference call.

20. The program product of claim 17, wherein the determining comprises accessing profiles for the moderator and the set of invitees to determine the unique conference call numbers.

21. The program product of claim 17, wherein the identifying comprises synchronizing with a calendar application used to schedule the conference call.

22. A method for deploying an application for managing conference calls, comprising:

providing a computer infrastructure being operable to:

identify a moderator and a set of invitees of a conference call;

determine unique conference call numbers associated with each of a plurality of users, that include the moderator and each of the set of invitees, every one of the moderator and the each of the set of invitees having a conference call number that is unique to that user and that is configured to enable the user to join a plurality of conference calls having differing moderators and sets of invitees;

receive a call from the moderator made using the unique conference call number assigned to the moderator;

receive a set of calls from each of the set of invitees made using the unique conference call numbers assigned to the set of invitees; and join the call and the set of calls to initiate the conference call.

* * * * *